United States Patent
Chen

(10) Patent No.: US 8,105,129 B2
(45) Date of Patent: Jan. 31, 2012

(54) INFLATING AND DEFLATING DEVICE FOR A PAD

(75) Inventor: Ying-Tze Chen, Taipei (TW)

(73) Assignee: Ying-Tze Chen, Taipei (TW)

( * ) Notice: Subject to any disclaimer, the term of this patent is extended or adjusted under 35 U.S.C. 154(b) by 446 days.

(21) Appl. No.: 12/437,562

(22) Filed: May 8, 2009

(65) Prior Publication Data

US 2009/0318058 A1    Dec. 24, 2009

(30) Foreign Application Priority Data

May 9, 2008   (TW) ................. 97208066 U

(51) Int. Cl.
*A41C 3/00*   (2006.01)
(52) U.S. Cl. .............. 450/38; 450/57; 450/54; 2/DIG. 3
(58) Field of Classification Search .............. 450/38, 450/54–57; 2/67, DIG. 3; 251/82, 244–246; 137/223–225, 230, 854, 601.2, 522–524, 137/843, 847; 297/284.6; 36/29; 441/30, 441/40, 41

See application file for complete search history.

(56) References Cited

U.S. PATENT DOCUMENTS

| | | | | |
|---|---|---|---|---|
| 5,697,974 A * | 12/1997 | Wang | ............... | 623/7 |
| 5,833,513 A * | 11/1998 | Llorens | ............... | 446/354 |
| 6,080,037 A * | 6/2000 | Lee et al. | ............... | 450/38 |
| 6,230,501 B1 * | 5/2001 | Bailey et al. | ............... | 62/51.1 |
| 6,302,760 B1 * | 10/2001 | Dai | ............... | 450/38 |
| 6,461,221 B1 * | 10/2002 | Stilwell et al. | ............... | 450/57 |
| 6,865,825 B2 * | 3/2005 | Bailey et al. | ............... | 36/88 |
| 7,107,706 B1 * | 9/2006 | Bailey et al. | ............... | 36/88 |
| 7,204,041 B1 * | 4/2007 | Bailey et al. | ............... | 36/29 |
| 7,278,445 B2 * | 10/2007 | Marvin et al. | ............... | 137/601.2 |
| 7,395,614 B1 * | 7/2008 | Bailey et al. | ............... | 36/28 |
| 7,942,722 B2 * | 5/2011 | Tseng | ............... | 450/38 |

* cited by examiner

*Primary Examiner* — Gloria Hale
(74) *Attorney, Agent, or Firm* — CKC & Partners Co., Ltd.

(57) ABSTRACT

An inflating and deflating device for connecting to an inner face of a pad includes a top cover having a first domed portion, an air intake and an air exit aperture; a bottom base connected to a lower side of the top cover; a bottom sealing cap; a deflating button located on the top cover to openably seal the air exit aperture; and a first and a second air locker unit. The bottom base has a second domed portion, which and the first domed portion together define a substantially spherical pump body, and is provided with an air intake and exit aperture. The first and second air locker units respectively openably close the air intake and the air intake and exit aperture. The inflating and deflating device has short airflow path and is airtight, and can be used to both inflate and deflate the pad.

13 Claims, 8 Drawing Sheets

INFLATING AND DEFLATING DEVICE FOR A PAD

FIELD OF THE INVENTION

The present invention relates to an inflating and deflating device, and more particularly to an inflating and deflating device that is suitable for use with an inflatable breast enhancer pad to both inflate and deflate the pad without the risk of leaking.

BACKGROUND OF THE INVENTION

Various inflatable pads have been widely employed in people's daily life, from the large-size air cushions for use as fire and lifesaving appliances or seat cushions to the small-size inflatable breast enhancer pads. These cushions or pads are either inflated using an external device, such as an air pump that force air into the cushions or the pads, or are directly equipped with an inflating device that can be manually operated to inflate the cushions or the pad. The conventional inflatable breast enhancer pad is one example of the pads equipped with an inflating device.

The inflatable breast enhancer pad is small in size but plays an important role in creating a more feminine and perfect breast shape. Generally, there are various kinds of breast enhancer pads, in which water, silicone or air can be filled. Among others, the breast enhancer pads filled with air are safest for use. Moreover, the air volume inside the breast enhancer pads can be regulated to change the contour and size of the pads according to the user's actual need.

FIG. 8 shows a conventional inflatable breast enhancer pad 90 having an inflating device connected to an inner side of the pad 90. The inflating device includes an inflating section 91 raised from an outer surface of the pad 90 and a deflating section 92. By manually pushing the pad 90 at the inflating section 91, the pad 90 can be inflated and expanded. On the other hand, by manually pushing the pad 90 at the deflating section 92, the pad 90 can be deflated to occupy only a reduced storing space or to have a reduced expansion degree.

While the above-described conventional inflatable breast enhancer pad 90 can be conveniently manually inflated and deflated via the inflating section 91 and the deflecting section 92, respectively, it involves relatively complicated manufacturing procedures and is easily subject to leaking because the inflating section 91 and the deflating section 92 are separately provided on the pad 90 to produce more joints that tend to adversely affect the air-tightness of the pad 90 at these joints. Other types of improved inflating devices have been developed to overcome the disadvantages of the conventional inflatable breast enhancer pad 90. One of the improved inflating devices includes a connecting tube to interconnect the inflating and the deflating section with each other, so as to integrate the inflating and deflating functions in one device. The conventional device integrating the inflating and deflating functions usually has complicated structure, and the connecting tube having a relative large length tends to lower the inflating efficiency while being subject to leaking, too. Therefore, most of the currently commercially available inflatable breast enhancer pads still adopt the separated inflating section 91 and deflating section 92.

SUMMARY OF THE INVENTION

A primary object of the present invention is to provide an inflating and deflating device that integrates inflating and deflating functions into one device to conveniently inflate and deflate a pad, so as to overcome the drawbacks in the conventional inflatable breast enhancer pad that has separated inflating and deflating devices.

To achieve the above and other objects, the inflating and deflating device for a pad according to an embodiment of the present invention is designed for connecting to an inner face of a pad and includes a top cover, a bottom base, a bottom sealing cap, a deflating button, a first air locker unit, and a second air locker unit. The top cover includes an upward protruded first domed portion, and a first upper valve cap and a second upper valve cap sequentially located to one side of the first domed portion. The first upper valve cap has an air intake, and the second upper valve cap has an air exit aperture. The bottom base is connected to a lower side of the top cover, and has a second domed portion, which with the first domed portion together define a substantially spherical pump body. The bottom base includes a first lower valve seat and a second lower valve seat sequentially located to one side of the second domed portion. The second lower valve seat is provided at a bottom thereof with an air intake and exit aperture. The first upper valve cap on the top cover is associated with the first lower valve seat, and the second upper valve cap on the top cover is associated with the second lower valve seat. The bottom sealing cap is externally fitted around the second lower valve seat, and is provided at a bottom thereof with an opening and on a sidewall thereof with at least one open slot. The deflating button has an elastic element fitted therearound, and is disposed in the second upper valve cap to openably close the air exit aperture on the second upper valve cap. The first air locker unit is received in a first inner space formed between the associated first upper valve cap and first lower valve seat to openably seal the air intake on the top cover. The second air locker unit is received in a second inner space formed between the associated bottom sealing cap and second lower valve seat to openably seal the air intake and exit aperture on the bottom base.

With the above arrangements, air inside the pad must first flow through the air intake and exit aperture on the second lower valve seat in the inflating and deflating device and then upward flows through the air intake on the first upper valve cap or the air exit aperture on the second upper valve cap before the air can flow to an outer side of the pad. Meanwhile, the air intake, the air exit aperture, and the air intake and exit aperture are respectively sealed by the first air locker unit, the deflating button, and the second air locker unit when the pad is not inflated or deflated via the inflating and deflating device. Therefore, the inflating and deflating device of the present invention has good air-tightness with little chance of leaking. Moreover, with the above arrangements, the inflating and deflating device of the present invention integrates the inflating and deflating functions and has very short airflow path therein to effectively overcome the drawbacks of complicated structure and leaking as found in the conventional pad inflating device that includes an externally connected tube.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIGS. 4, 5 and 6 are sectional views showing the inflating and deflating device of FIG. 1 is associated with a pad for inflating and deflating the pad; wherein FIG. 4 shows the inflating and deflating device is compressed to inflate the pad; FIG. 5 shows the inflating and deflating device is released to suck in air; and FIG. 6 shows a deflating button of the inflating and deflating device is pushed to deflate the pad;

DETAILED DESCRIPTION OF THE PREFERRED EMBODIMENTS

Figure 1:
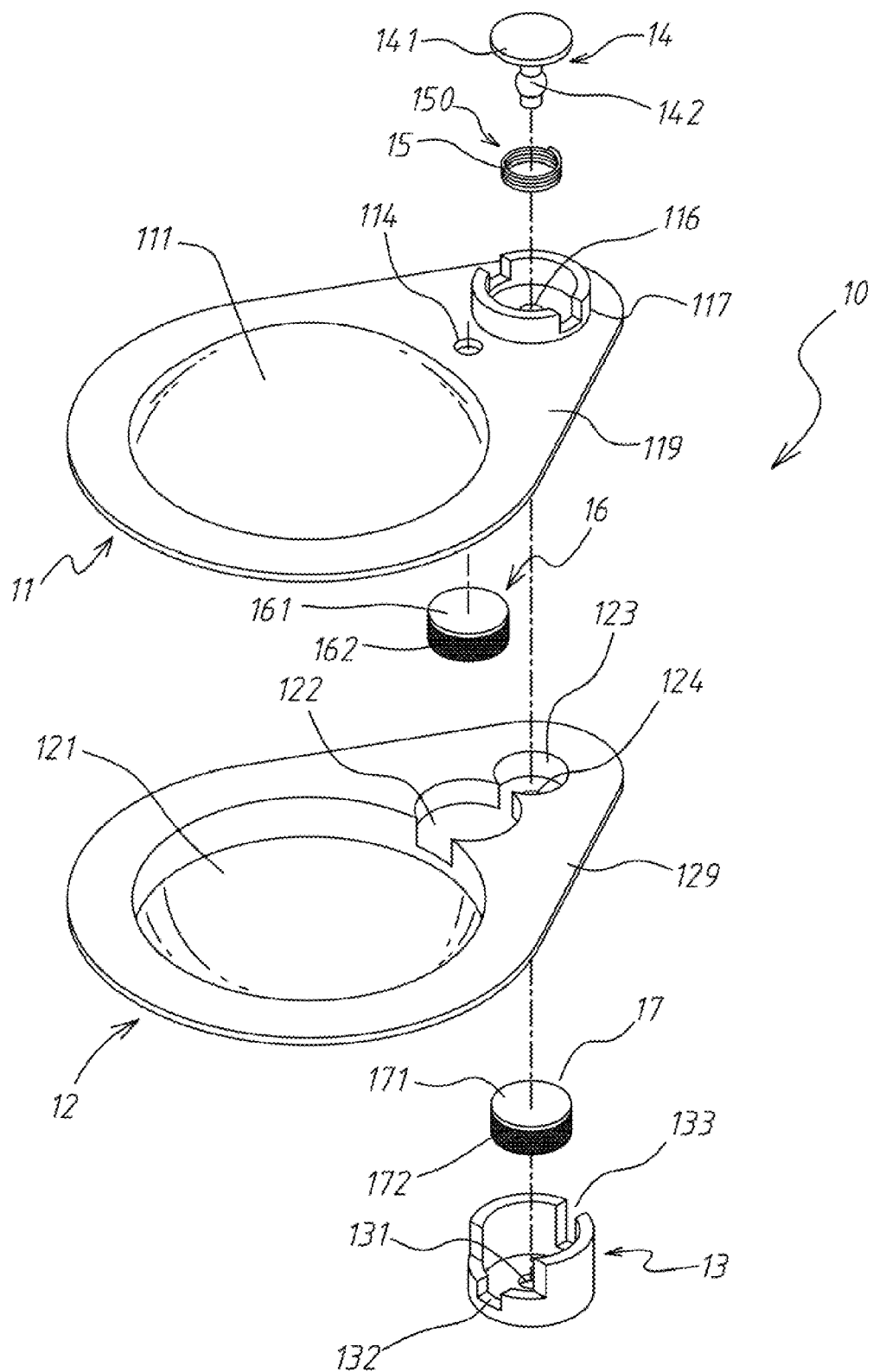
FIG. 1 is an exploded perspective view of an inflating and deflating device for pad according to a first embodiment of the present invention.
Figure 2:
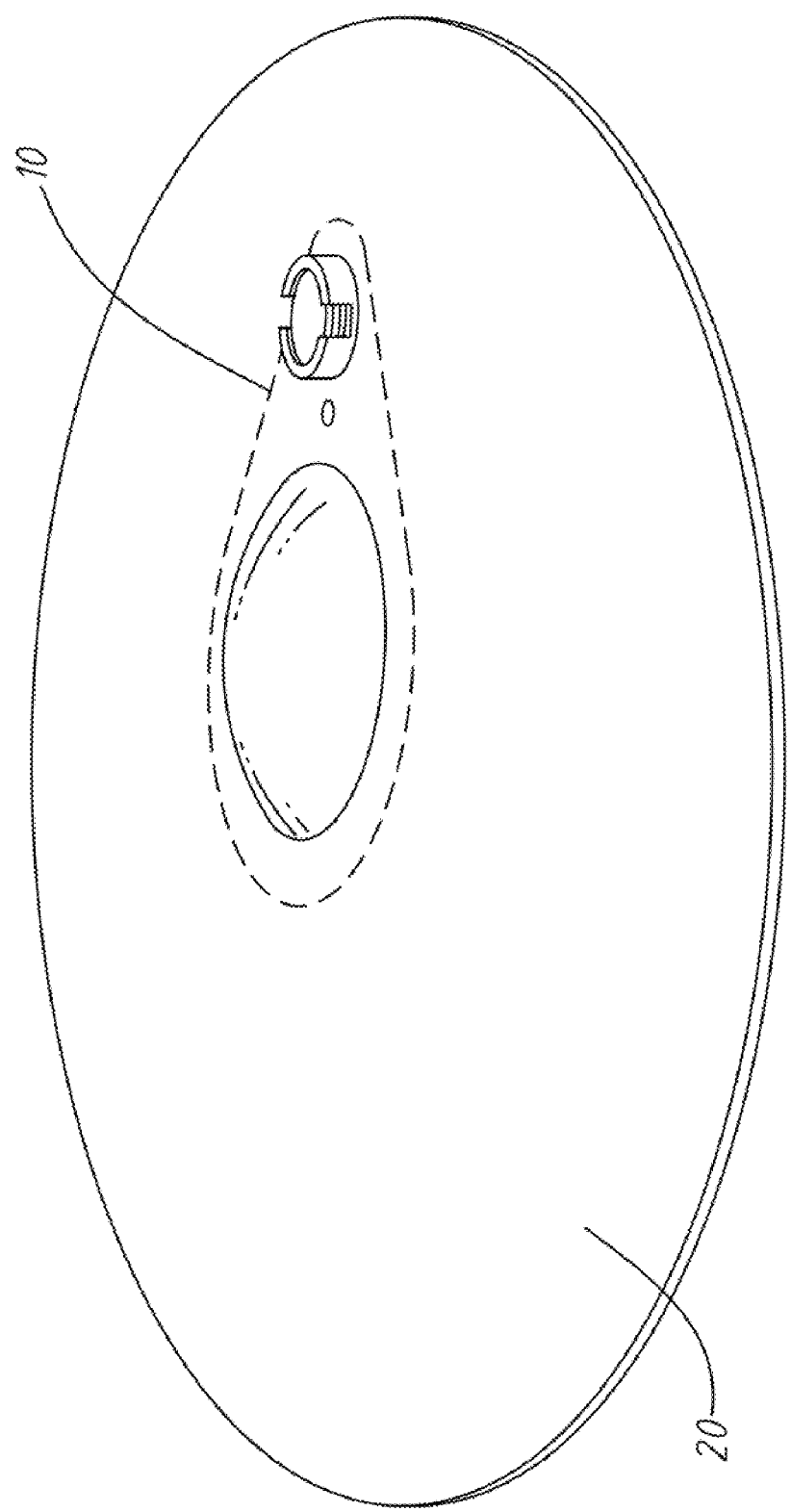
FIG. 2 is an assembled view showing the inflating and deflating device of FIG. 1 is associated with a pad.
Figure 3:
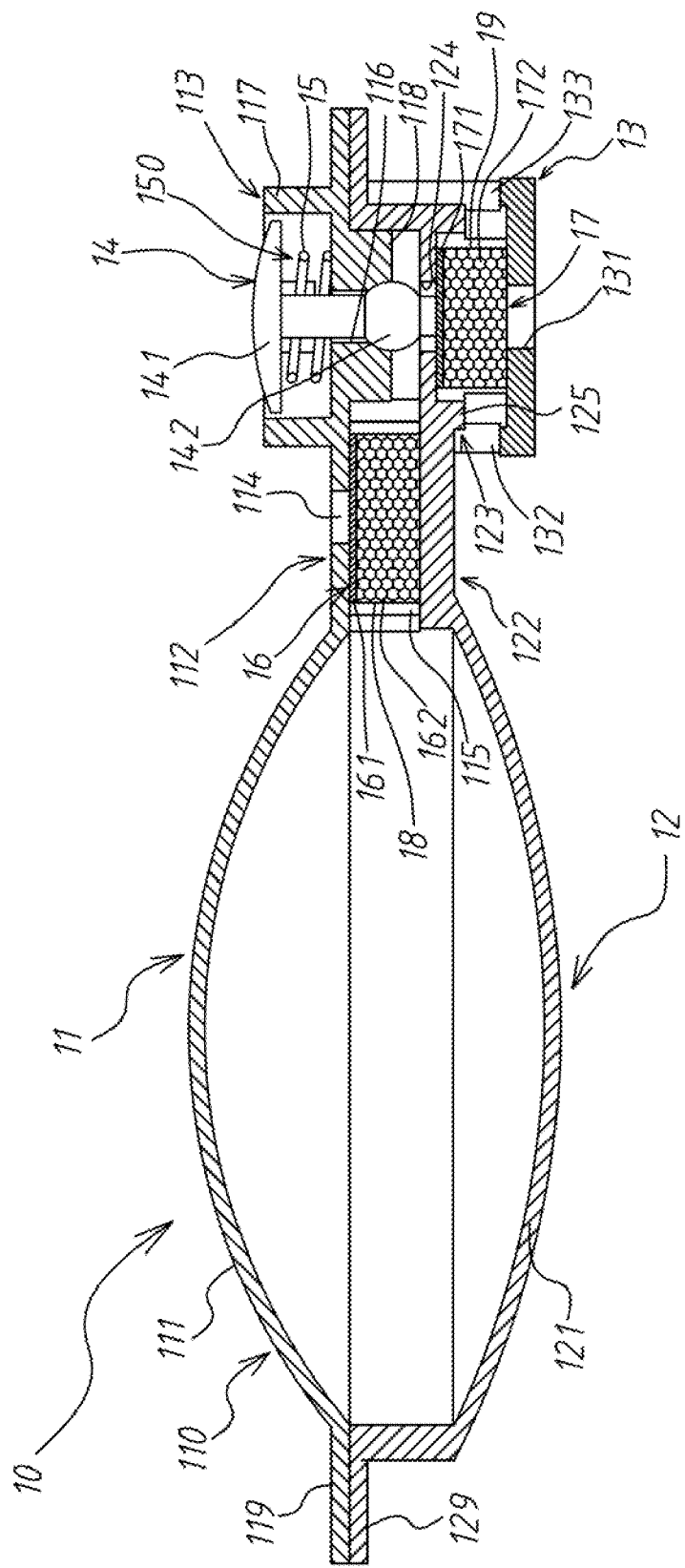
FIG. 3 is an assembled sectional view of the inflating and deflating device of FIG. 1.

Please refer to FIGS. 1, 2 and 3, in which an inflating and deflating device 10 according to a first embodiment of the present invention is shown. The inflating and deflating device 10 is designed for associating with different inflatable products, such as a pad 20 as shown in FIG. 2, and includes a top cover 11, a bottom base 12, a bottom sealing cap 13, a deflating button 14, a first air locker unit 16, and a second air locker unit 17.

The top cover 11 is a thin sheet having an upward protruded first domed portion 111, and has a first upper valve cap 112 and a second upper valve cap 113 sequentially located to one side of the first domed portion 111. The first upper valve cap 112 includes an air intake 114 located on the thin sheet, and a first annular leg 115 downward extended from the thin sheet, as can be seen from FIG. 3. The second upper valve cap 113 includes an air exit aperture 116, a second annular leg 117 upward extended from the thin sheet with the air exit aperture 116 centered therein, and a downward extended portion 118 formed below the second annular leg 117 with the air exit aperture 116 formed thereon and extended therethrough.

The bottom base 12 is connected to a lower side of the top cover 11, and has a second domed portion 121 downward protruded from the bottom base 12, such that the first and the second domed portion 111, 121 together define a substantially spherical pump body 110. A first lower valve seat 122 and a second lower valve seat 123 are formed on the bottom base 12 to sequentially locate to one side of the second domed portion 121. The second lower valve seat 123 is provided at a bottom thereof with an air intake and exit aperture 124 and has a downward extended third annular leg 125, as can be seen from FIG. 3. The first annular leg 115 of the first upper valve cap 112 on the top cover 11 is received in the first lower valve seat 122 on the bottom base 12, and the downward extended portion 118 having the air exit aperture 116 and formed below the second upper valve cap 113 is received in the second lower valve seat 123.

The bottom sealing cap 13 is externally fitted around the second lower valve seat 123 of the bottom base 12. The bottom sealing cap 13 is provided at a bottom thereof with an opening 131, and on a sidewall thereof with at least one open slot. In the illustrated first embodiment, there are two open slots 132, 133 provided at two diametrically opposite positions on the sidewall of the bottom sealing cap 13.

The deflating button 14 is fitted in the second upper valve cap 113, and includes a push head 141 located at an upper end thereof and an air-blocking portion 142 located near a middle lower section thereof. The air-blocking portion 142 is located at a lower end of the air exit aperture 116 in the second upper valve cap 113. An elastic element 150, such as a spring 15, is fitted below the push head 141 of the deflecting button 14 to normally push the deflecting button 14 upward, bringing the air-blocking portion 142 to a high position to normally seal the air exit aperture 116. However, when the deflecting button 14 is pushed, the air-block portion 142 is brought to a low position to move away from and accordingly open the air exit aperture 116.

The first and the second air locker unit 16, 17 of the inflating and deflating device 10 each consist of an elastic and light-weight body made of, for example, a foam material, and an airtight blocking plate. The first air locker unit 16 is disposed in a first inner space 18 formed between the associated first upper valve cap 112 and first lower valve seat 122, and consists of a first blocking plate 161 and a first foam-material body 162 located below the first blocking plate 161. The first blocking plate 161 is made of an airtight material for blocking and closing the air intake 114. The first foam-material body 162 has breathability and elastic restoring force and can serve as an elastomer to normally push the first blocking plate 161 upward against the air intake 114, as shown in FIG. 3. Therefore, when the inflating and deflating device 10 of the present invention is not manipulated, the first blocking plate 161 is at a high position to close the air intake 114.

The second air locker unit 17 is disposed in a second inner space 19 formed between the associated bottom sealing cap 13 and second lower valve seat 123. More specifically, the second air locker unit 17 is located in a space between an inner bottom face of the bottom sealing cap 13 and an outer bottom face of the second lower valve seat 123. Similarly, the second air locker unit 17 consists of a second blocking plate 171 and a second foam-material body 172 located below the second blocking plate 171. When the inflating and deflating device 10 of the present invention is not manipulated, the second blocking plate 171 is at a high position to close the air intake and exit aperture 124. In the illustrated first embodiment, the first blocking plate 161 and the first foam-material body 162 of the first air locker unit 16 are integrally formed into one body; and the second blocking plate 171 and the second foam-material body 172 of the second air locker unit 17 are also integrally formed into one body. However, it is understood the blocking plates 161, 171 and the foam-material bodies 162, 172 can be otherwise separately formed. In another operable embodiment of the present invention, the elastic and light-weight bodies for the first and the second air locker unit 16, 17 each are an elastic element, such as a spring (not shown).

Figure 4:
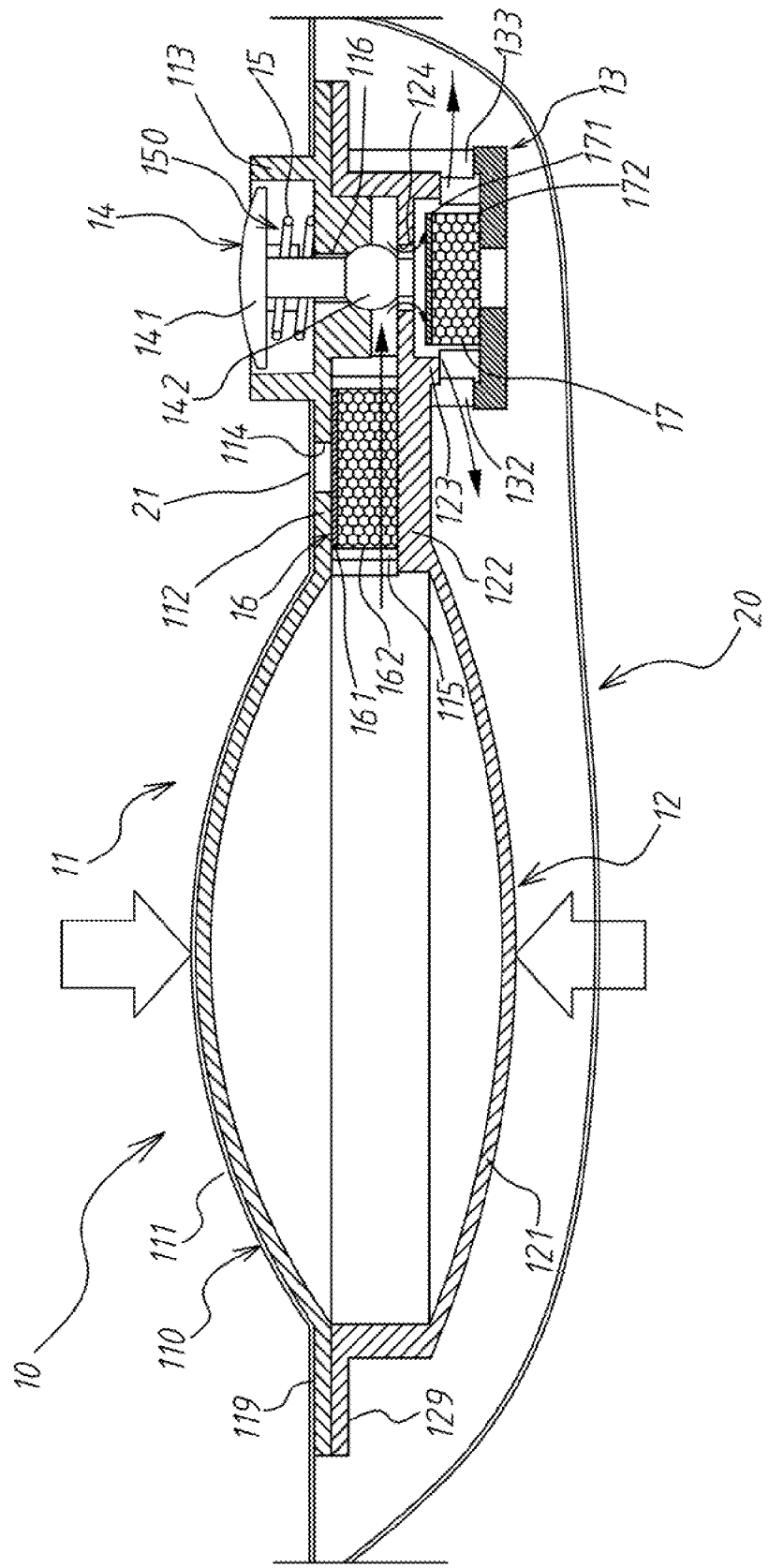
Figure 5:
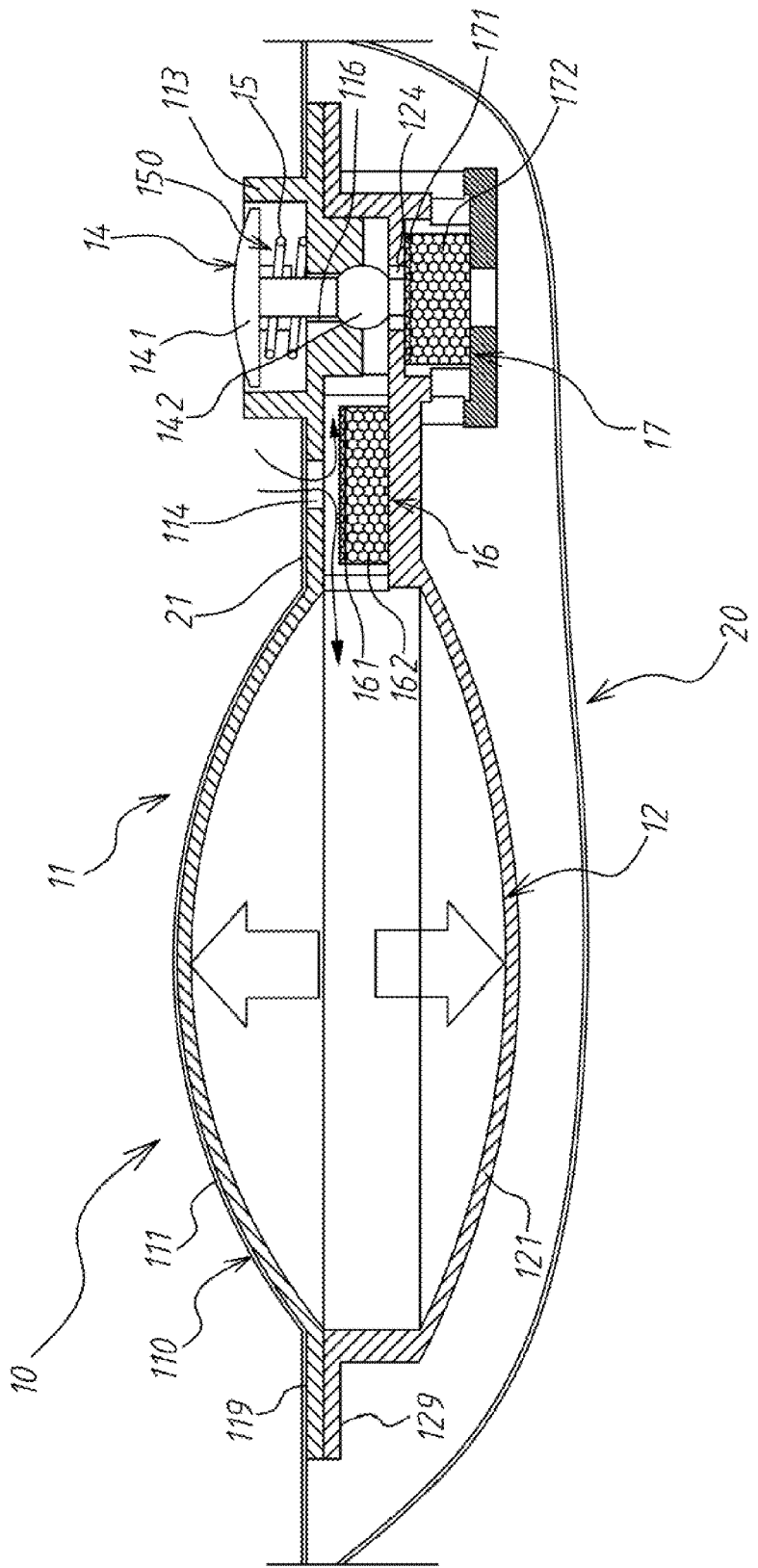
Figure 6:
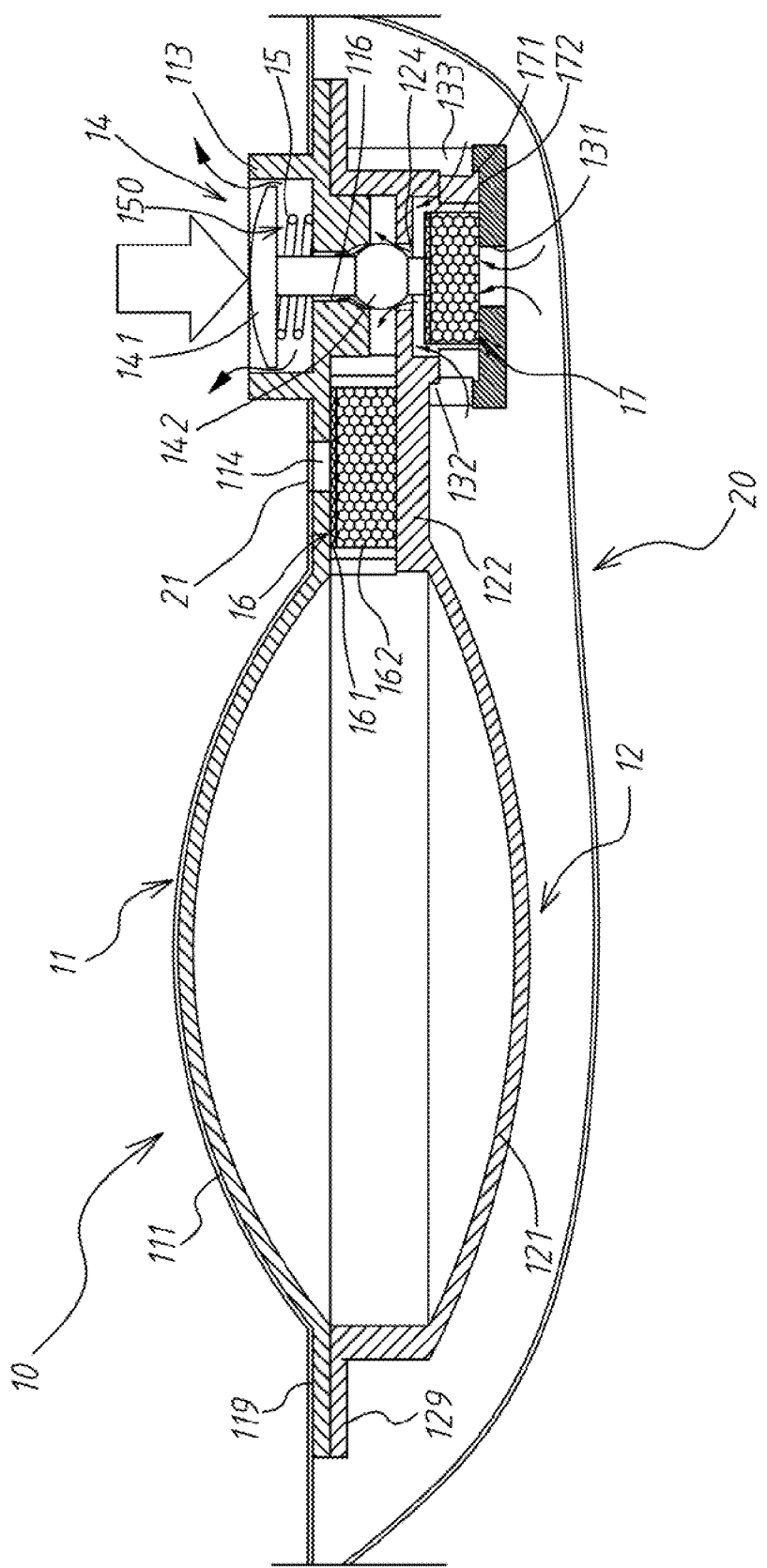

In practical application thereof, the inflating and deflating device 10 according to the first embodiment of the present invention can be connected to an inner face of a pad 20 (see FIG. 2) or to a predetermined position on any other inflatable articles, such as inflatable clothes and inflatable shoes, by way of glue bonding or high-frequency welding. FIGS. 4 to 6 illustrate the manner of manipulating the inflating and deflating device 10 of the present invention to inflate or deflate the pad 20.

Please refer to FIG. 4. When the first domed portion 11 of the top cover 11 and the second domed portion 121 of the bottom base 12 forming the spherical pump body 110 are simultaneously pressed toward each other, air originally stored inside the spherical pump body 110 is forced out of the spherical pump body 110 to first pass through the breathable first foam-material body 162 of the first air locker unit 16 disposed in the first annular leg 115 of the first upper valve cap 112 and then the air intake and exit aperture 124 on the bottom base 12 to downward compress the second air locker unit 17. At this point, the air intake and exit aperture 124 is opened, allowing the air to flow into the pad 20 via the two open slots 132, 133 provided on two opposite sides of the bottom sealing cap 13. In the above-described inflating process, the first blocking plate 161 of the first air locker unit 16 is still pushed upward by the first foam-material body 162 to normally close the air intake 114 on the first upper valve cap 112. Meanwhile, the spring 15 keeps elastically pushing the deflating button 14 upward for the air-blocking portion 142 to press against and seal a lower end of the air exit aperture 116. Therefore, the air can only be admitted to the pad 20 to inflate the same without leaking out of the pad 20 via the air intake 114 or the air exit aperture 116.

Please refer to FIG. 5. When the spherical pump body 110 is released from the pressure, it restores to an original shape to produce negative pressure. At this point, the atmospheric pressure outside the pad 20 will automatically downward compress the first air locker unit 16 via the air intake 114 to thereby open the air intake 114, admitting air outside the pad 20 to the spherical pump body 110 via the air intake 114 and be stored in the spherical pump body 110 for outputting at the next inflating operation. Further, the second air locker unit 17 returns to its original position and the second blocking plate 171 seals the bottom of the second lower valve seat 123 again to close the air intake and exit aperture 124, preventing the air previously admitted to the pad 20 from being sucked into the spherical pump body 110 via the air intake and exit aperture 124.

Please refer to FIG. 6. When it is desired to regulate the air volume in the fully inflated pad 20, simply push the push head 141 of the deflating button 14 downward, so that the spring 15 is compressed and the air-blocking portion 142 is moved downward and no longer seals the lower end of the air exit aperture 116. Meanwhile, a lower end of the downward pushed deflating button 14 would in turn downward compress the second air locker unit 17 to thereby open the air intake and exit aperture 124 again. At this point, the air inside the pad 20 can flow through the air intake and exit aperture 124 and the air exit aperture 116 to escape from the pad 20.

From the above described inflation and deflation operations, it is understood the air intake 114 and the air exit aperture 116 for the inflating and deflating device 10 according to the first embodiment of the present invention are communicable with the pad 20 via the air intake and exit aperture 124 instead of being directly communicable with the pad 20. That is, both the air-intake path and the air-exit path pass two air locking valves, enabling the inflating and deflating device 10 to provide good air-tightness without the risk of leaking. Therefore, the pad 20 or other similar inflatable products with the inflating and deflating device 10 according to the first embodiment of the present invention provided thereon can be inflated and deflated via the same one device and have very good air-tightness.

In the inflating and deflating device 10 according to the first embodiment of the present invention, the top cover 11 and the bottom base 12 respectively have a shaped flange portion 119, 129 surrounding the first and the second domed portion 111, 121, respectively. And, the top cover 11 and the bottom base 12 are conveniently and tightly attached to each other at the flanged portions 119, 129. Further, the inflating and deflating device 10 is connected at an upper side of the shaped flange portion 119 and the first domed portion 111 of the top cover 11 to an inner face of the pad 20, and the pad 20 is provided at a position near the air intake 114 on the first upper valve cap 112 of the top cover 11 with an aperture 21 (see FIGS. 4 to 6) to admit external air to the inflating and deflating device 10. Preferably, the aperture 21 is provided on the pad 20 at a position aligned with the air intake 114 to achieve the best possible intake effect.

Figure 7:
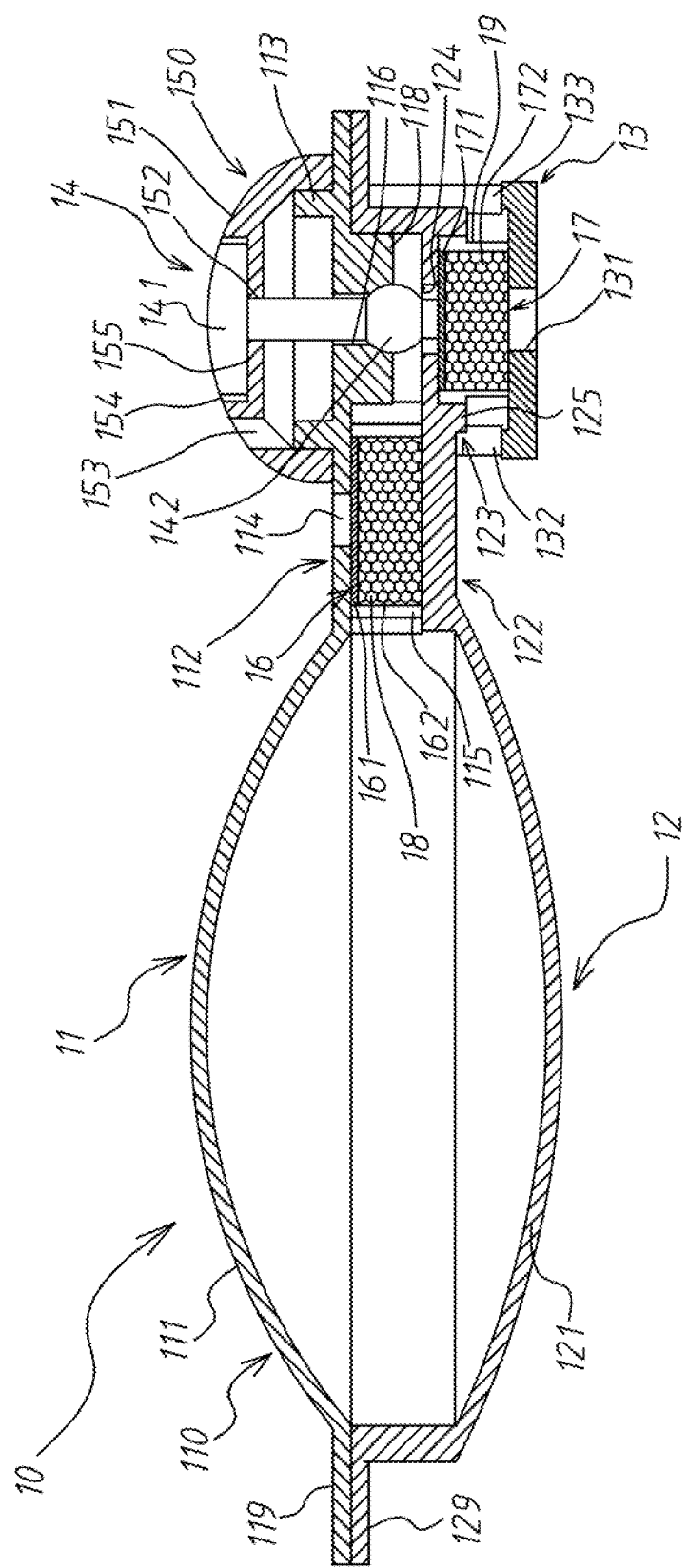
FIG. 7 is an assembled sectional view of an inflating and deflating device for pad according to a second embodiment of the present invention, in which an elastic cap is used as an elastic element for the deflating button of the device.
Figure 8:
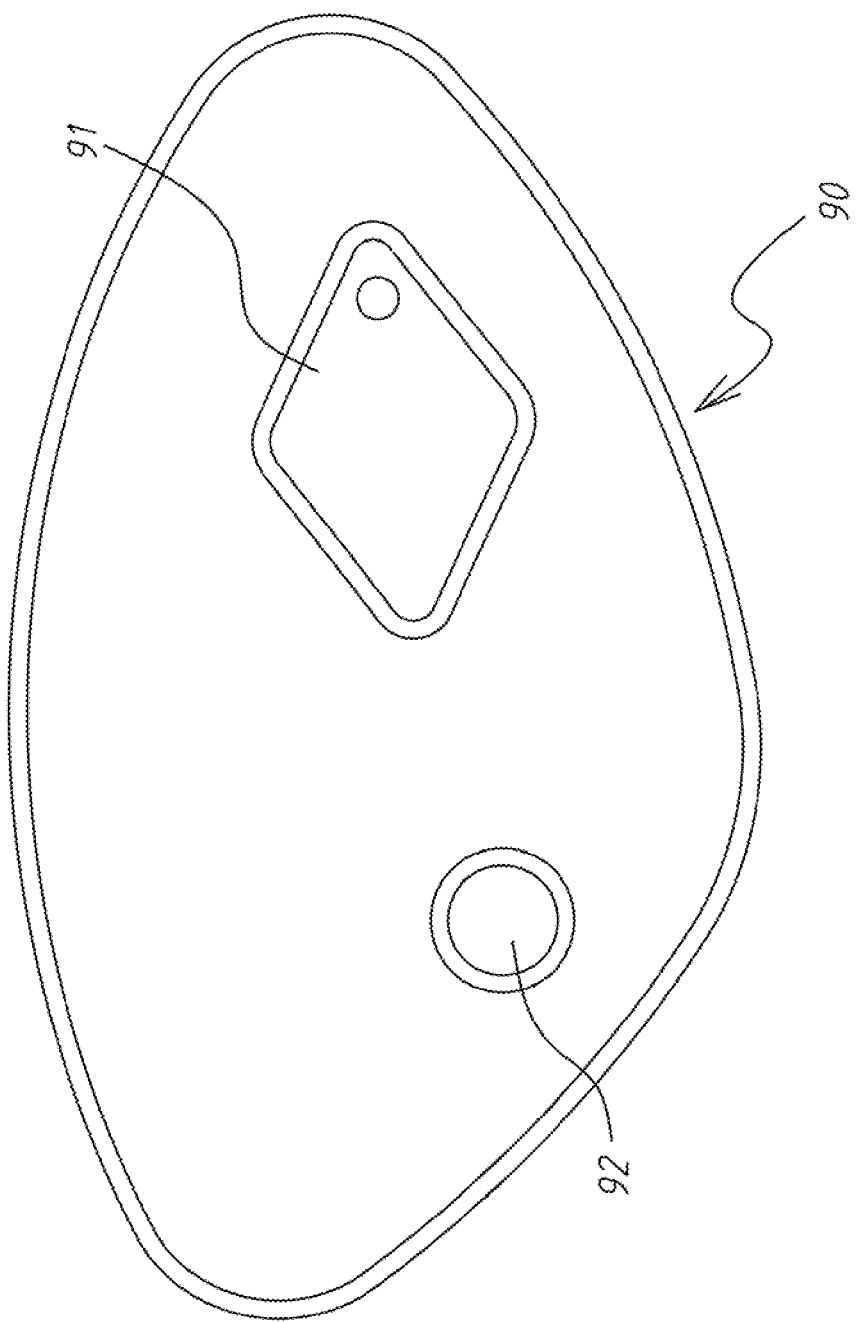
FIG. 8 shows a conventional inflatable breast enhancer pad.

FIG. 7 shows an inflating and deflating device 10 according to a second embodiment of the present invention. The second embodiment is generally structurally similar to the first embodiment, except that the elastic element 150 provided at the second upper valve cap 112 for fitting around the deflating button 14 is an elastic cap 151 in the second embodiment. The elastic cap 151 has a top formed into an open-topped cavity 154 having a bottom plate 155. A first through-hole 152 is formed on the bottom plate 155, and the elastic cap 151 is provided at positions near the first through-hole 152 with a plurality of second through-holes 153. The deflation button 14 is downward extended through the first through-hole 152 with the push head 141 at the upper end of the deflating button 14 received in the cavity 154 to seat on the bottom plate 155. When the elastic cap 151 is pressed and then released, it can elastically restore to an original shape. Therefore, the elastic cap 151 can be used to provide a restoring force to the deflating button 14. The second through-holes 153 are provided to give the elastic cap 151 an increased elasticity, and also serve as air exit paths.

The second embodiment illustrated in FIG. 7 can be manipulated in the same manner as described above with reference to FIGS. 4 to 6 to achieve the same effect.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An inflating and deflating device, wherein the inflating and deflating device is in combination with a breast enhancer pad, the breast enhancer pad has an inner face and the inflating and deflating device is connected to the inner face, comprising:

a top cover including an upward protruded first domed portion, and having a first upper valve cap and a second upper valve cap sequentially located to one side of the first domed portion, wherein the first upper valve cap including an air intake, and the second upper valve cap including an air exit aperture, and the upward protruded first domed portion is connected to the inner face of the breast enhancer pad;

a bottom base being connected to a lower side of the top cover and having a downward protruded second domed portion, such that the first and the second domed portion together define a substantially spherical pump body; a first lower valve seat and a second lower valve seat being formed on the bottom base to sequentially locate to one side of the second domed portion; the second lower valve seat being provided at a bottom thereof with an air intake and exit aperture, the first upper valve cap on the top cover being associated with the first lower valve seat on the bottom base, and the second upper valve cap on the top cover being associated with the second lower valve seat on the bottom base;

a bottom sealing cap being externally fitted around the second lower valve seat on the bottom base, and being provided at a bottom with an opening and on a sidewall with at least one open slot;

a deflating button having an elastic element fitted therearound and being disposed in the second upper valve cap to openably seal the air exit aperture on the second upper valve cap;

a first air locker unit being disposed in a first inner space defined between the associated first upper valve cap and first lower valve seat for openably closing the air intake on the top cover; and a second air locker unit being disposed in a second inner space defined between the associated second lower valve seat and bottom sealing cap for openably closing the air intake and exit aperture on the bottom base.

2. The inflating and deflating device as claimed in claim 1, wherein the first upper valve cap on the top cover has a downward extended first annular leg being received in the first lower valve seat on the bottom base, and the second upper valve cap is formed at a lower side with a downward extended portion being received in the second lower valve seat.

3. The inflating and deflating device as claimed in claim 1, wherein the deflating button includes a push head located at an upper end thereof and an air-blocking portion located near a middle lower section thereof, and the air-blocking portion is located at a lower end of the air exit aperture in the second upper valve cap to normally close the air exit aperture.

4. The inflating and deflating device as claimed in claim 1, wherein the first and the second air locker unit each include an airtight air-blocking plate and a spring located below the air-blocking plate.

5. The inflating and deflating device as claimed in claim 1, wherein the first and the second air locker unit each include an airtight air-blocking plate and a breathable form-material body located below the air-blocking plate.

6. The inflating and deflating device as claimed in claim 5, wherein the air-blocking plate and the foam-material body of the first and the second air locker unit can be an integrally formed unit or two separate components.

7. The inflating and deflating device as claimed in claim 1, wherein the top cover and the bottom base respectively have a shaped flange portion surrounding the domed portion, and are air-tightly connected at the two shaped flange portions.

8. The inflating and deflating device as claimed in claim 1, wherein the shaped flange portion is connected to an inner face of the breast enhancer pad.

9. The inflating and deflating device as claimed in claim 8, wherein the breast enhancer pad is provided at a position near the air intake on the top cover with an aperture.

10. The inflating and deflating device as claimed in claim 1, wherein the elastic element is a spring.

11. The inflating and deflating device as claimed in claim 1, wherein the elastic element is an elastic cap provided with a first through-hole, and the deflating button being downward extended through the first through-hole to fit therein.

12. The inflating and deflating device as claimed in claim 11, wherein the elastic cap is provided at positions near the first through-hole with a plurality of second through-holes.

13. The inflating and deflating device as claimed in claim 12, wherein the elastic cap has a top formed into an open-topped cavity having a bottom plate, on which the first through-hole is formed, and the deflating button has a push head provided at an upper end thereof; the deflating button being downward extended through the first through-hole with the push head received in the cavity to seat on the bottom plate.

* * * * *